US008275048B2

(12) United States Patent
Kitahara et al.

(10) Patent No.: US 8,275,048 B2
(45) Date of Patent: Sep. 25, 2012

(54) VIDEO ENCODING METHOD AND APPARATUS, VIDEO DECODING METHOD AND APPARATUS, PROGRAMS THEREFOR, AND STORAGE MEDIA FOR STORING THE PROGRAMS

(75) Inventors: Masaki Kitahara, Yokohama (JP); Hideaki Kimata, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1228 days.

(21) Appl. No.: 10/588,404

(22) PCT Filed: Sep. 30, 2005

(86) PCT No.: PCT/JP2005/018187
§ 371 (c)(1),
(2), (4) Date: Aug. 3, 2006

(87) PCT Pub. No.: WO2006/038568
PCT Pub. Date: Apr. 13, 2006

(65) Prior Publication Data
US 2008/0317115 A1    Dec. 25, 2008

(30) Foreign Application Priority Data
Oct. 7, 2004  (JP) ................................ 2004-294414

(51) Int. Cl.
*H04N 7/12*      (2006.01)
*H04N 11/02*     (2006.01)
*H04N 11/04*     (2006.01)
*G06K 9/36*      (2006.01)
*G06K 9/46*      (2006.01)
(52) U.S. Cl. ............... 375/240.26; 375/240.01; 382/236
(58) Field of Classification Search .................... 375/240
See application file for complete search history.

(56) References Cited

U.S. PATENT DOCUMENTS

| 5,767,898 | A |  | 6/1998 | Urano et al. |
| 5,991,447 | A | * | 11/1999 | Eifrig et al. ................... 382/236 |
| 6,008,852 | A |  | 12/1999 | Nakaya |
| 6,614,846 | B1 |  | 9/2003 | Fujiwara et al. |
| 6,658,152 | B2 |  | 12/2003 | Matsumoto |
| 6,714,591 | B1 |  | 3/2004 | Katata et al. |
| 2004/0091159 | A1 |  | 5/2004 | Takahashi |
| 2005/0185711 | A1 | * | 8/2005 | Pfister et al. ............. 375/240.01 |
| 2006/0047674 | A1 | * | 3/2006 | Visharam et al. ............. 707/101 |

FOREIGN PATENT DOCUMENTS
CN    1497984 A    5/2004
(Continued)

OTHER PUBLICATIONS
Puri, "Video Cpding with Motion-Compensated Interpolation for CD-ROM Applications", Signal Processing Image Communication 2, 1990, pp. 127-144.*

(Continued)

*Primary Examiner* — Behrooz Senfi
*Assistant Examiner* — Hee-Yong Kim
(74) *Attorney, Agent, or Firm* — Harness, Dickey & Pierce, P.L.C.

(57) ABSTRACT

A video encoding method for assigning a plurality of images to a plurality of GOPs and encoding images belonging to the GOPs as a video image. The method includes determining whether each image belonging to each GOP is to be encoded; encoding GOP encoding/non-encoding data for indicating whether encoded data of the image belonging to the relevant GOP is output; and encoding the image belonging to the relevant GOP when the encoded data of the image is output. Typically, it is determined whether an image generated by using one or more other GOPs without decoding the encoded data of the relevant GOP is closer to an original image of the relevant image in comparison with an image obtained by decoding the encoded data, so as to determine whether the image belonging to the relevant GOP is to be encoded.

16 Claims, 7 Drawing Sheets

FOREIGN PATENT DOCUMENTS

| | | | |
|---|---|---|---|
| JP | 2-264522 | A | 10/1992 |
| JP | 5-130586 | A | 5/1993 |
| JP | 6-98312 | A | 4/1994 |
| JP | 7-143494 | A | 6/1995 |
| JP | 7-154799 | | 6/1995 |
| JP | 9-261653 | A | 10/1997 |
| JP | 10-290463 | A | 10/1998 |
| JP | 2000-278715 | A | 10/2000 |
| TW | 421972 | B | 2/2001 |
| TW | 423257 | B | 2/2001 |
| TW | 555114 | Y | 9/2003 |
| WO | 00/11597 | A1 | 3/2000 |

OTHER PUBLICATIONS

Hideaki Kimata, Masaki Kitahara, Kazuto Kamikura, Yoshiyuki Yashima, Toshiaki Fujii, and Masayuki Tanimoto, "System Design of Free Viewpoint Video Communication," The Fourth International Conference on Computer and Information Technology 2004 (CIT'04), Sep. 14, 2004, pp. 52-59.

Hiroshi Fujiwara, 'Point Zukaishiki Saishin MPEG Kyokasho', Ascii Corp., Aug. 1, 1994, pp. 118-119.

Hideaki Kimata and Masaki Kitahara, "Preliminary Results on multiple view video coding (3DAV)," document M10976 MPEG Redmond Meeting, Jul. 2004.

T. Fujii, T. Kimoto, M. Tanimoto, "Compression of 3D Space Information based on the Ray Space Representation", 3D Image Conference '96, pp. 1-6, Jul. 1996.

T. Kobayashi, T. Fujii, T. Kimoto, M. Tanimoto, "Interpolation of Ray-Space Data by Adaptive Filtering," IS&T/SPIE Electronic Imaging 2000, 2000.

M. Kawaura, T. Ishigami, T. Fujii, T. Kimoto, M. Tanimoto, "Efficient Vector Quantization of Epipolar Plane Images of Ray Space by Dividing into Oblique Blocks", Picture Coding Symposium 2001, pp. 203-206, 2001.

Aydinoglu, Haluk, et al., "Compression of Multi-view Images," Proceedings of the International Conference on Image Processing (ICIP), IEEE Comp. Soc. Press, vol. 2, Nov. 13, 1994, pp. 385-389.

\* cited by examiner (a) PREDICTION RELATIONSHIP FOR SEQUENCE IBBPBBP (b) ORDER FOR ENCODING

VIDEO ENCODING METHOD AND APPARATUS, VIDEO DECODING METHOD AND APPARATUS, PROGRAMS THEREFOR, AND STORAGE MEDIA FOR STORING THE PROGRAMS

TECHNICAL FIELD

The present invention relates to techniques for video encoding and decoding, preferably applied to video techniques for changing a viewing position or direction.

BACKGROUND ART

In general video coding, interframe predictive coding is used so as to achieve a high encoding efficiency by using temporal correlation. Frame encoding modes include: "I frame" for which encoding is performed without using interframe correlation, "P frame" for which prediction is performed based on one frame which has been encoded, and "B frame" for which prediction can be performed using two frames which have been encoded.

More specifically, "P frame" can be predicted using "I frame" or "P frame", and "B frame" can be predicted using "I frame", "P frame", or "B frame". In particular, in video coding standard H.264, decoded images of a plurality of frames are stored in a reference image (or picture) memory in an encoding apparatus, and any reference image can be selected and read out from the memory to be used for prediction. Additionally, in a P frame, prediction is performed using a temporally past frame in an input video image; however, in a B frame, prediction can be performed using not only a temporally past frame but also a future frame.

In FIG. 7, part (a) shows an example of a prediction relationship assigned to a video image.

Regarding a B frame for which prediction is performed using two frames (in bidirectional prediction), image data of two relevant frames are subjected to interpolation so as to generate image data for one frame. When encoding first to seventh frames with an encoding mode sequence of "IBBPBBP", there is a prediction relationship shown in part (a). Therefore, with frame numbers 1 to 7 respectively assigned to the frames shown in part (a) from the left, these frames are actually encoded in the frame-number order of "1→4→2→3→7→5→6" as shown in part (b) in FIG. 7.

In an interlace video image, one frame includes two fields. Also in this case, a prediction relationship is determined for each field, similar to the above case. Either the frame or the field is generically called the "picture". In the bidirectional prediction for B frame, prediction can be performed using two past frames or two future frames. For example, in the video coding standard H.264, a plurality of frames of decoded images are stored in a reference image memory, and reference images for two frames can be selected and read out from the memory so as to perform the prediction. Here, the index times of the selected frames after decoding may be before or after the index time of a target frame to be encoded.

In addition, when a set of pictures having an "I picture" as the head thereof can be determined as a GOP (group of pictures), it is possible to easily realize a temporal random access function for encoded data per GOP unit.

With regard to this GOP, data for indicating the head of the GOP is provided before the encoded data of a specific picture, so as to indicate that this picture is the head of the GOP consisting of a plurality of pictures starting from this picture. In MPEG-2 standard, the head of GOP is indicated by inserting a code having a specific bit pattern.

That is, encoded data of one GOP can be formed between codes each indicating the head of a GOP. Instead of including a code for indicating the head of a GOP in the encoded data, GOP formation data independent of the encoded data may be employed.

Generally, after the data for indicating the head of the GOP, time data of the head frame of the GOP is also provided, which is used for implementing a temporal random access function. In addition, each picture may be provided with time data.

For example, such time data is called "TR(time reference)" in the H.263 standard. TR is data for indicating the output order of frames based on a unit time. If the unit time is set to $1/30$ sec, value increment by one for each frame is equivalent to a frame rate of 30 frames/sec. Usually, TR is subjected to fixed-length encoding.

In order to encode video images obtained by a plurality of (video) cameras, a method has been proposed in which each camera image is determined as a GOP, and predictive encoding is applied between GOPs so as to generate one encoded video data.

For example, in Non-Patent Document 1 or Non-Patent Document 2 described later, "Base GOP" and "InterGOP" are defined so as to indicate a prediction relationship between the GOPs. Each picture included in the Base GOP refers to only pictures included in the same GOP, and each picture included in the InterGOP refers to pictures included in the same GOP or another GOP. The header portion of the InterGOP includes reference GOP data for indicating a GOP to be referred to.

Therefore, when a plurality of video images input from a plurality of cameras are obtained in advance, the viewing position and direction can be changed by switching the input image. Accordingly, the image corresponding to the position where photographing was performed is obtained. In addition to this, a technique has also been proposed for producing an image corresponding to a viewing position or direction at or in which no photographing is performed.

For example, Non-Patent Document 3 described below discloses a technique for producing an image corresponding to a viewing position or direction at or in which no photographing is performed, by generating a ray space using images input from a plurality of cameras and extracting image data from the ray space.

Generally in such a video generating technique, when the same subject is included in input images obtained by a plurality of cameras, image data of the subject corresponding to a viewing position or direction at or in which no photographing is performed is generated using the obtained image data. That is, image data for a subject which is present over input images obtained by a plurality of cameras is generated using part of each input image.

An adaptive filtering method (refer to Non-Patent Document 4) or a table reference method (refer to Non-Patent Document 5) belongs to the above image generating technique.

Non-Patent Document 1: Hideaki Kimata and Masaki Kitahara, "Preliminary results on multiple view video coding (3DAV)," document M10976 MPEG Redmond Meeting, July, 2004.

Non-Patent Document 2: Hideaki Kimata, Masaki Kitahara, Kazuto Kamikura, Yoshiyuki Yashima, Toshiaki Fujii, and Masayuki Tanimoto, "System Design of Free Viewpoint Video Communication," CIT2004, September, 2004.

Non-Patent Document 3: T. Fujii, T. Kimoto, M. Tanimoto, "Compression of 3D Space Information based on the Ray Space Representation", 3D Image Conference '96, pp. 1-6, July, 1996.

Non-Patent Document 4: T. Kobayashi, T. Fujii, T. Kimoto, M. Tanimoto, "Interpolation of Ray-Space Data by Adaptive Filtering", IS&T/SPIE Electronic Imaging 2000, 2000.

Non-Patent Document 5: M. Kawaura, T. Ishigami, T. Fujii, T. Kimoto, M. Tanimoto, "Efficient Vector Quantization of Epipolar Plane Images of Ray Space By Dividing into Oblique Blocks", Picture Coding Symposium 2001, pp. 203-206, 2001.

With regard to the video images obtained by a plurality of video cameras, when images having sufficiently high quality can be obtained by a technique for generating a video image corresponding to a viewing position or direction at or in which no photographing is performed, a desired image can be reproduced on the video decoding side without encoding corresponding image data obtained by a certain camera, thereby improving the encoding efficiency with respect to the images obtained by the plurality of video cameras.

However, conventional video coding methods have no device for determining on the video decoding side whether a desired image can be reproduced without using the corresponding image obtained by a certain camera and also no device for encoding data for indicating that such reproduction is possible. Therefore, actually, video images of all video cameras are encoded and output; thus, the encoding efficiency cannot be improved.

DISCLOSURE OF INVENTION

In light of the above circumstances, an object of the present invention is to provide a novel video encoding and decoding technique preferably applicable to, for example, a video technique for changing the viewing position or direction, by providing devices for determining on the video decoding side whether an image can be reproduced without using the corresponding image obtained by a certain camera and for encoding data for indicating that this production is possible.

Therefore, the present invention provides a video encoding method for assigning a plurality of images to a plurality of GOPs and encoding images belonging to the GOPs as a video image, the method comprising:

a GOP encoding determination step of determining whether each image belonging to each GOP is to be encoded;

a GOP encoding/non-encoding data encoding step of encoding GOP encoding/non-encoding data for indicating whether encoded data of the image belonging to the relevant GOP is output; and an in-GOP image encoding step of encoding the image belonging to the relevant GOP when the encoded data of the image is output.

In a typical example, the GOP encoding determination step includes determining whether an image generated by using one or more other GOPs without decoding the encoded data of the relevant GOP is closer to an original image of the relevant image in comparison with an image obtained by decoding the encoded data, so as to determine whether the image belonging to the relevant GOP is to be encoded.

The video encoding method may further comprise a generation reference-GOP encoding step of encoding generation reference-GOP designating data for designating one or more other GOPs which are used for generating the image belonging to the relevant GOP when the encoded data of this image is not output.

The video encoding method may further comprise a generation data encoding step of encoding generation data for designating an image generation method which is used for generating the image belonging to the relevant GOP when the encoded data of this image is not output.

The present invention also provides a video decoding method for decoding encoded data generated by assigning a plurality of images to a plurality of GOPs and encoding images belonging to the GOPs as a video image, the method comprising:

a GOP encoding/non-encoding data decoding step of decoding GOP encoding/non-encoding data for indicating whether the encoded data of each image belonging to each GOP is to be decoded; and an in-GOP image decoding step of decoding the image belonging to the relevant GOP when the encoded data of the image is decoded.

The video decoding method may further comprise a generation reference-GOP decoding step of decoding generation reference-GOP designating data for designating one or more other GOPs which are used for generating the image belonging to the relevant GOP when the encoded data of this image is not decoded.

The video decoding method may further comprise a generation data decoding step of decoding generation data for designating an image generation method which is used for generating the image belonging to the relevant GOP when the encoded data of this image is not decoded.

The present invention also provides a video encoding apparatus for assigning a plurality of images to a plurality of GOPs and encoding images belonging to the GOPs as a video image, the apparatus comprising:

a GOP encoding determination part for determining whether each image belonging to each GOP is to be encoded;

a GOP encoding/non-encoding data encoding part for encoding GOP encoding/non-encoding data for indicating whether encoded data of the image belonging to the relevant GOP is output; and an in-GOP image encoding part for encoding the image belonging to the relevant GOP when the encoded data of the image is output.

In a typical example, the GOP encoding determination part determines whether an image generated by using one or more other GOPs without decoding the encoded data of the relevant GOP is closer to an original image of the relevant image in comparison with an image obtained by decoding the encoded data, so as to determine whether the image belonging to the relevant GOP is to be encoded.

The video encoding apparatus may further comprise a generation reference-GOP encoding part for encoding generation reference-GOP designating data for designating one or more other GOPs which are used for generating the image belonging to the relevant GOP when the encoded data of this image is not output.

The video encoding apparatus may further comprise a generation data encoding part for encoding generation data for designating an image generation method which is used for generating the image belonging to the relevant GOP when the encoded data of this image is not output.

The present invention also provides a video decoding apparatus for decoding encoded data generated by assigning a plurality of images to a plurality of GOPs and encoding images belonging to the GOPs as a video image, the apparatus comprising:

a GOP encoding/non-encoding data decoding part for decoding GOP encoding/non-encoding data for indicating whether the encoded data of each image belonging to each GOP is to be decoded; and an in-GOP image decoding part for decoding the image belonging to the relevant GOP when the encoded data of the image is decoded.

The video decoding apparatus may further comprise a generation reference-GOP decoding part for decoding generation reference-GOP designating data for designating one or more other GOPs which are used for generating the image belonging to the relevant GOP when the encoded data of this image is not decoded.

The video decoding apparatus may further comprise a generation data decoding part for decoding generation data for designating an image generation method which is used for generating the image belonging to the relevant GOP when the encoded data of this image is not decoded.

The present invention also provides a video encoding program for making a computer execute a process used for implementing the above-described video encoding method, and a computer-readable storage medium storing this program.

The present invention also provides a video decoding program for making a computer execute a process used for implementing the above-described video decoding method, and a computer-readable storage medium storing this program.

Each program can be stored in a computer-readable storage medium so as to be provided, or can also be provided via a network. The present invention can be implemented by installing the relevant program so as to operate the program by a control device such as a CPU.

In accordance with the present invention, GOPs are respectively assigned to video images input from video cameras. When a video image can be generated using an image generation method, it is possible to select a process in which the GOP assigned to the video image is not encoded and a relevant image is generated on the image reproduction side.

That is, the image encoding side determines whether an image input from a certain camera can be generated using an image generation method. When it is possible, GOP encoding/non-encoding data is encoded so as to indicate that no encoded data of the image included in the GOP is output. On the other hand, when the relevant image cannot be generated, the GOP encoding/non-encoding data is encoded so as to indicate that encoded data of the image included in the GOP is output. Accordingly, when the relevant image cannot be generated, the image included in the GOP is encoded (i.e., the encoded data of the image included in the GOP is output).

Accordingly, the video decoding side decodes the GOP encoding/non-encoding data for indicating whether the encoded data of the image included in the relevant GOP is to be decoded. When the GOP encoding/non-encoding data indicates that the encoded data of the image included in the relevant GOP is to be decoded, the encoded data of the image is decoded.

When the GOP encoding/non-encoding data indicates that the encoded data of the image included in the relevant GOP is not to be decoded, the image decoding side may generate the relevant image in the GOP using an image generation method. However, if this image is not required, it is unnecessary to generate the image.

Additionally, in accordance with the present invention, when a camera-input video image is generated on the image decoding side, the GOP which includes image(s) used for the image generation can be designated. Each image of the GOP used for the image generation may be obtained by decoding encoded data, or also be generated by image generation on the image decoding side.

Accordingly, when the image decoding side generates a desired image of a GOP, if an image necessary for the image generation has not yet been decoded or generated, the GOP including this image is decoded or generated, so that the desired image can be generated. Here, the GOP including the image used for generating a desired video image may be a video image input from another camera, or a video image of a camera assigned to the desired image.

Additionally, in accordance with the present invention, when a camera-input video image is generated on the image decoding side, the image generation method used for generating the image can be generated.

With regard to the image generation method, the image encoding side and the image decoding side each may prepare a plurality of image generation methods in advance, and the image encoding side may select the image generation method used on the image decoding side. In this case, an image generation method for producing high image quality can be selected on the image encoding side.

When a desired video image to be reproduced is generated using a video image input from a camera assigned to the desired video image, an image of a previous (or past) GOP also input from this camera may be used. Additionally, if the number of the cameras is small and the GOP used for the image generation is limited, it may be unnecessary to designate the GOP to be used.

In accordance with the present invention, whether the image can be generated on the decoding side can be determined in the encoding process, and the data for indicating that the image is to be generated can be encoded. Therefore, the image encoding side can control whether a video image is not to be encoded, thereby improving the encoding efficiency. Accordingly, in accordance with the present invention, it is possible to provide a video encoding and decoding technique preferably applicable to a video technique for changing the viewing position or direction.

BEST MODE FOR CARRYING OUT THE INVENTION

Below, the present invention will be explained in detail in accordance with its embodiments.

The embodiments explained below show a technique used when images by three cameras are encoded, and the technique is provided for independently encoding the images obtained by two of the three cameras, and determining whether the image obtained by the other one camera is to be generated using the image data of the two cameras, or a past image of said one camera, without using the present image of this one camera.

I. First Embodiment

Figure 1:
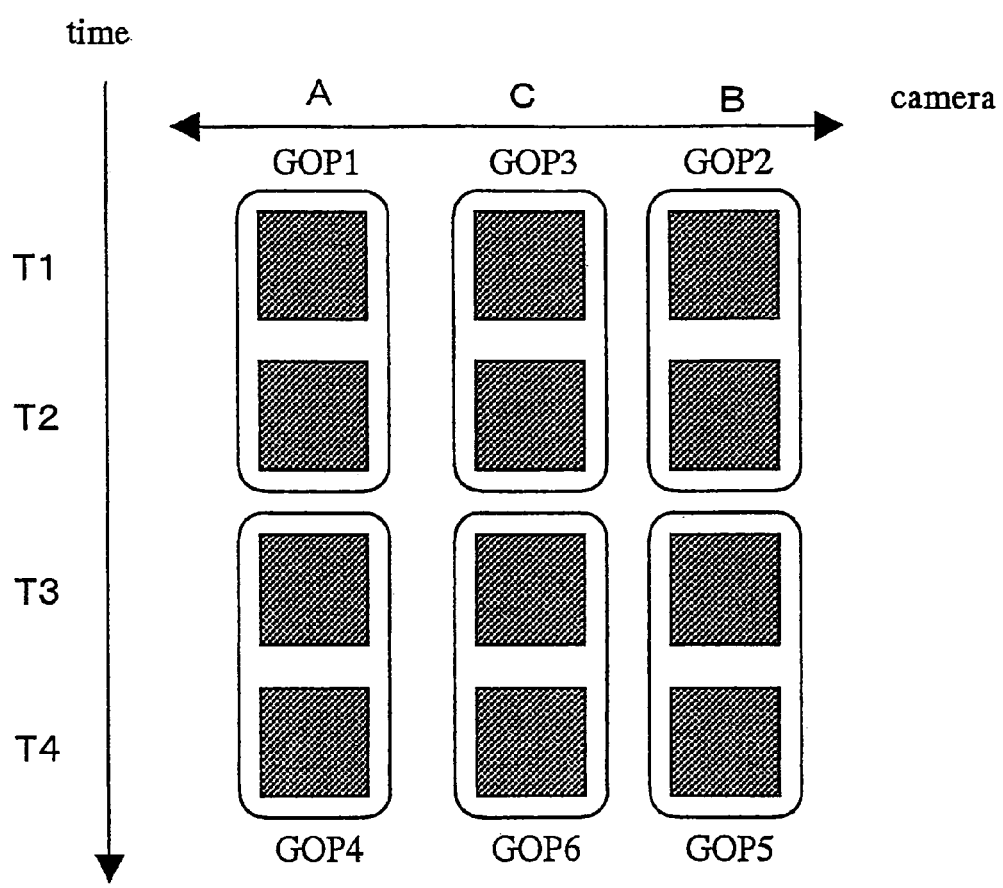
FIG. 1 is a diagram showing an example of the GOP configuration in the first embodiment.

FIG. 1 shows GOPs defined in the first embodiment.

As shown in FIG. 1, in the first embodiment, it is predefined that each GOP consists of two frames. In addition, a GOP number (GOP1 to GOP6 shown in FIG. 1) is assigned to each GOP.

Among three video (camera) images A, B, and C in FIG. 1, the image C is a target for determination about whether the image is to be generated using an image generation technique. As a method for generating the image C using the image A or B, an image generation method X and an image generation method Y are provided in advance. As a method for generating an image using the past image data of the video image C, an image generation method Z is provided.

If A or B is selected as an image used for image generation, data for designating the image generation method is encoded. However, when a past picture of the video image C is selected for generating an image, the image generation method Z is uniquely selected; thus, it is unnecessary to encode such data for designating the image generation method. In the present embodiment, a picture immediately before is output in the image generation method Z.

The image generation method X may be an adaptive filtering method, and the image generation method Y may be a table reference method. In the embodiment explained below, the image generation method applied to the video image C is determined using decoded images of the video images A and B.

I-1. Video Encoding Apparatus of the Present Invention for Implementing the First Embodiment FIG. 2 shows an example of the structure of a video encoding apparatus of the present invention for implementing the first embodiment.

Figure 2:
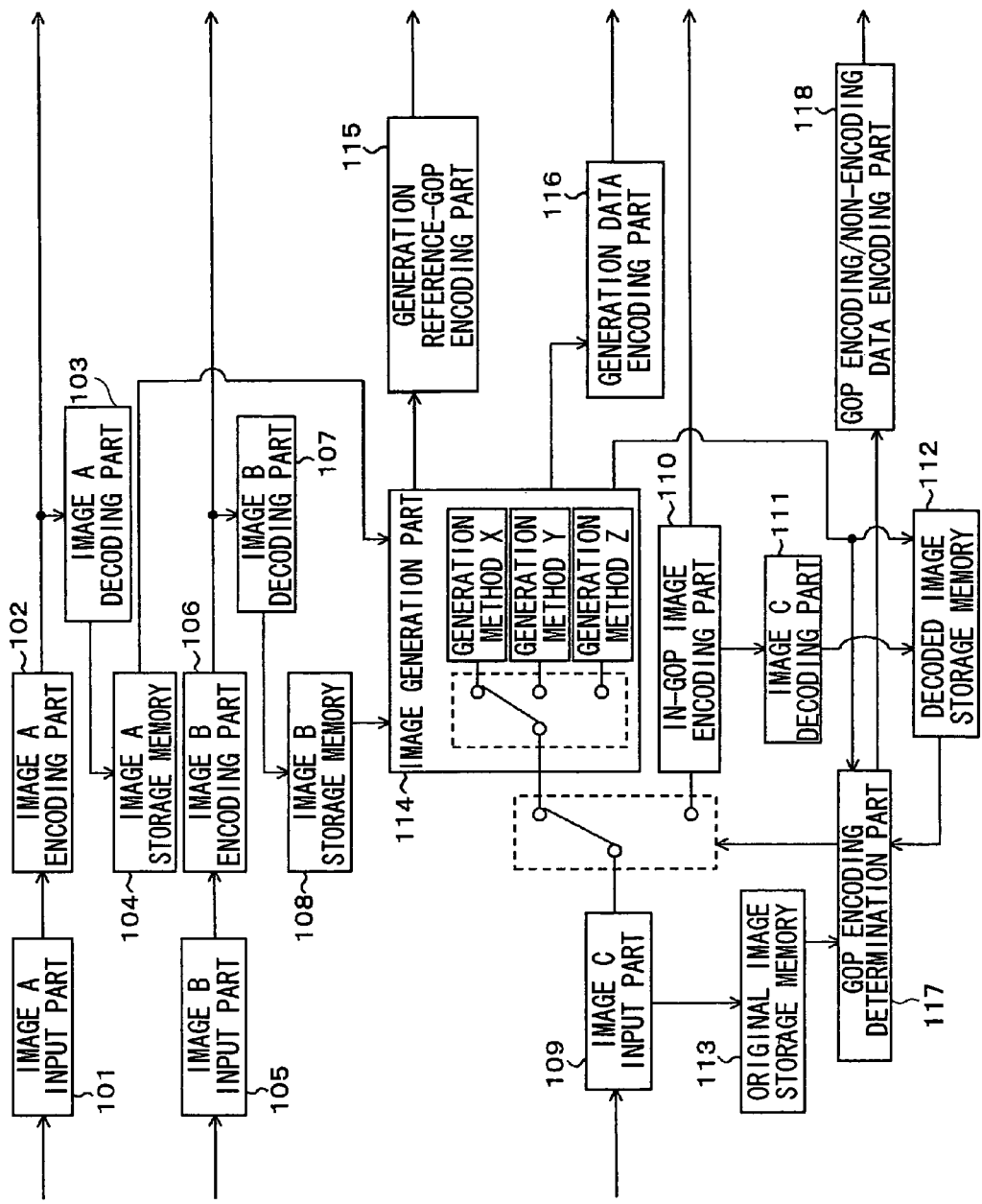
FIG. 2 is a diagram showing an example of the structure of the video encoding apparatus in the first embodiment.

As shown in FIG. 2, the video encoding apparatus in accordance with the present invention has:

(i) (with regard to the image A (camera-input video image A)) an image A input part 101 for inputting the image, an image A encoding part 102 for encoding the image input by the image A input part 101, an image A decoding part 103 for decoding the image encoded by the image A encoding part 102, and an image A storage memory 104 for storing the image decoded by the image A decoding part 103, (ii) (with regard to the image B (camera-input video image B)) an image B input part 105 for inputting the image, an image B encoding part 106 for encoding the image input by the image B input part 105, an image B decoding part 107 for decoding the image encoded by the image B encoding part 106, and an image B storage memory 108 for storing the image decoded by the image B decoding part 107, and (ii) (with regard to the image C (camera-input video image C)) an image C input part 109 for inputting the image, an in-GOP image encoding part 110 for encoding the image input by the image C input part 109, an image C decoding part 111 for decoding the image encoded by the image C encoding part 110, a decoded image storage memory 112 for storing the image decoded by the image C decoding part 111, an original image storage memory 113 for storing an original image input by the image C input part 109, an image generation part 114 for generating the image C without using the original image C, a generation reference-GOP encoding part 115 for encoding data for designating a GOP used for generating the image C (actually, the data is the GOP number), a generation data encoding part 116 for encoding data for designating the image generation method used for the generation of the image C, a GOP encoding determination part 117 for determining whether a relevant image of a GOP is to be encoded, and a GOP encoding/non-encoding data encoding part 118 for encoding data for indicating whether the image of the GOP has been encoded.

Both the image A storage memory 104 and the image B storage memory 108 store two frames of the decoded image, and the original image storage memory 113 stores two frames of the original image. In addition, the decoded image storage memory 112 stores three frames of the decoded image. In each memory, no image data is stored in the initial state.

The GOP encoding determination part 117 first computes a mean square error X between image data (of two frames, generated frame by frame) generated by the image generation part 114 using the image generation method X and the image stored in the original image storage memory 113. In this process, (i) when only the image in the image A storage memory 104 is used for the image generation, the computed mean square error is called Xa, (ii) when only the image in the image B storage memory 108 is used for the image generation, the computed mean square error is called Xb, and (iii) when images stored in both the image A storage memory 104 and the image B storage memory 108 are used, the computed mean square error is called Xc.

The GOP encoding determination part 117 also computes a mean square error Y between image data (of two frames, generated frame by frame) generated by the image generation part 114 using the image generation method Y and the image stored in the original image storage memory 113. In this process, (i) when only the image in the image A storage memory 104 is used for the image generation, the computed mean square error is called Ya, (ii) when only the image in the image B storage memory 108 is used for the image generation, the computed mean square error is called Yb, and (iii) when images stored in both the image A storage memory 104 and the image B storage memory 108 are used, the computed mean square error is called Yc.

Among images decoded by the image C decoding part 111 and stored in the decoded image storage memory 112 (here, images encoded by the in-GOP encoding part 110 are decoded), the GOP encoding determination part 117 refers to the decoded image of the present GOP and computes a mean square error D between this decoded image and a corresponding image stored in the original image storage memory 113.

When the image of the previous GOP is stored in the decoded image memory 112, the GOP encoding determination part 117 also computes a mean square error Z between image data (of two frames, generated frame by frame) generated using the image generation method Z and the image stored in the original image storage memory 113.

The GOP encoding determination part 117 compares the mean square errors Xa, Xb, Xc, Ya, Yb, Yc, and D, or the mean square errors Xa, Xb, Xc, Ya, Yb, Yc, D, and Z (as computed above) with each other, and determines that the conditions assigned to the minimum mean square error are used as "encoding data" of the present or target GOP (i.e., the encoding data consists of GOP encoding/non-encoding data, data for designating a generation reference-GOP (i.e., a GOP referred to in the image generation), and data for designating (or selecting) the image generation method). That is, determination is performed as follows.

In the following explanation, "encoded data" and "encoding data" are clearly distinguished, and "encoded data" indicates data of an encoded image.

(1) When the Mean Square Error Xa is Minimum

When Xa is minimum, the image generation method X is designated, and a GOP of the image A is designated as the generation reference-GOP.

In this case, the GOP encoding/non-encoding data encoding part 118 encodes GOP encoding/non-encoding data so as to indicate that no encoded data is output. In addition, the generation reference-GOP encoding part 115 encodes the number of the GOP used, and the generation data encoding part 116 encodes data for designating the image generation method X.

(2) When the Mean Square Error Xb is Minimum

When Xb is minimum, the image generation method X is designated, and a GOP of the image B is designated as the generation reference-GOP.

In this case, the GOP encoding/non-encoding data encoding part 118 encodes the GOP encoding/non-encoding data so as to indicate that no encoded data is output. In addition, the generation reference-GOP encoding part 115 encodes the number of the GOP used, and the generation data encoding part 116 encodes the data for designating the image generation method X.

(3) When the Mean Square Error Xc is Minimum

When Xc is minimum, the image generation method X is designated, and the GOPs of the images A and B are designated as the generation reference-GOPs.

In this case, the GOP encoding/non-encoding data encoding part 118 encodes the GOP encoding/non-encoding data so as to indicate that no encoded data is output. In addition, the generation reference-GOP encoding part 115 encodes the number of each GOP used, and the generation data encoding part 116 encodes the data for designating the image generation method X.

(4) When the Mean Square Error Ya is Minimum

When Ya is minimum, the image generation method Y is designated, and a GOP of the image A is designated as the generation reference-GOP.

In this case, the GOP encoding/non-encoding data encoding part 118 encodes the GOP encoding/non-encoding data so as to indicate that no encoded data is output. In addition, the generation reference-GOP encoding part 115 encodes the number of the GOP used, and the generation data encoding part 116 encodes data for designating the image generation method Y.

(5) When the Mean Square Error Yb is Minimum

When Yb is minimum, the image generation method Y is designated, and a GOP of the image B is designated as the generation reference-GOP.

In this case, the GOP encoding/non-encoding data encoding part 118 encodes the GOP encoding/non-encoding data so as to indicate that no encoded data is output. In addition, the generation reference-GOP encoding part 115 encodes the number of the GOP used, and the generation data encoding part 116 encodes the data for designating the image generation method Y.

(6) When the Mean Square Error Yc is Minimum

When Yc is minimum, the image generation method Y is designated, and GOPs of the images A and B are designated as the generation reference-GOPs.

In this case, the GOP encoding/non-encoding data encoding part 118 encodes the GOP encoding/non-encoding data so as to indicate that no encoded data is output. In addition, the generation reference-GOP encoding part 115 encodes the number of each GOP used, and the generation data encoding part 116 encodes the data for designating the image generation method Y.

(7) When the Mean Square Error Z is Minimum

When Z is minimum, the image generation method Z is designated, and a GOP of the image C is designated as the generation reference-GOP.

In this case, the GOP encoding/non-encoding data encoding part 118 encodes the GOP encoding/non-encoding data so as to indicate that no encoded data is output. In addition, the generation reference-GOP encoding part 115 encodes the number of the GOP used.

As described above, when a past C image is selected as an image used for the image generation, the image generation method Z is uniquely determined as the image generation method; thus, the generation data encoding part 116 does not need to encode data for designating the image generation method.

(8) When the Mean Square Error D is Minimum

When D is minimum, encoded data obtained by the encoding of the in-GOP image encoding part 110 is output.

In this case, the GOP encoding/non-encoding data encoding part 118 encodes the GOP encoding/non-encoding data so as to indicate that the encoded data is output, and the in-GOP image encoding part 110 outputs the encoded data.

That is, in any of the above cases (1) to (7), it is determined that the target image of the camera C can be generated on the video decoding side without using the image data of the target image, and in the case of the above item (8), it is determined that the target image cannot be generated without using the image data thereof.

Under these preconditions, the video encoding apparatus in accordance with the present invention encodes camera-input video images as follows.

(i) Encoding Process at Times T1 and T2

First at times T1 and T2, images A and B are encoded.

With regard to the image A, the image is input using the image A input part 101, the image A encoding part 102 encodes this image, the image A decoding part 103 decodes the encoded data, and the image A storage memory 104 stores the decoded image. These steps are performed for each of the images at times T1 and T2. Therefore, the images at times T1 and T2 are stored in the image A storage memory 104.

With regard to the image B, the image is input using the image B input part 105, the image B encoding part 106 encodes this image, the image B decoding part 107 decodes the encoded data, and the image B storage memory 108 stores the decoded image. These steps are performed for each of the images at times T1 and T2. Therefore, the images at times T1 and T2 are stored in the image B storage memory 108.

Next, the image C input part 109 inputs the image C, and the original image storage memory 113 stores the input image. The in-GOP image encoding part 110 encodes the images at times T1 and T2, and the image C decoding part 111 decodes the encoded data, and the decoded data is stored in the decoded image storage memory 112.

The image generation part 114 then generates images by applying both the image generation method X and the image generation method Y to the image stored in the image A storage memory 104 and the image stored in the image B storage memory 108. In this process, no previous frame is present; thus, it is impossible to generate an image using the image generation method Z.

Through the above processes, the GOP encoding determination part 117 uses the images generated by the image generation part 114 and the images stored in the decoded image storage memory 112, so as to compute the mean square errors Xa, Xb, Xc, Ya, Yb, Yc, and D (at this point, the mean square error Z cannot be obtained). In accordance with the logic determined by the above-described cases (1) to (8), the encoding data of the GOP is determined.

Based on the determined encoding data of the GOP, the video encoding apparatus in accordance with the present invention encodes and outputs the GOP encoding/non-encoding data, and also outputs the encoded data, or encodes and outputs the data for indicating the number of the generation reference-GOP and the data for indicating the image generation method. If the image generation method Z is selected, it is unnecessary to encode the data for indicating the image generation method (in this stage, the image generation method Z cannot be selected).

When the encoded data is output from the in-GOP image encoding part 110, the decoded image storage memory 112 continuously stores the decoded images obtained by the image C decoding part 111. On the other hand, when no encoded data is output from the in-GOP image encoding part 110, the decoded image storage memory 112 deletes the decoded images at times T1 and T2, and stores images corresponding to the encoding data of the GOP which is determined by the GOP encoding determination part 117, among the images generated by the image generation part 114 (i.e., images generated by the selected image generation method).

(ii) Encoding Process at Times T3 and T4

Next, a process similar to that performed at times T1 and T2 is performed at times T3 and T4, so as to encode the images A and B.

Among the decoded images stored in the image A storage memory 104 and the image B storage memory 108, the oldest one is deleted so as to store a newly decoded image, so that decoded images of times T3 and T4 are stored in each memory.

Next, the image C input part 109 inputs the image C, and the original image storage memory 113 stores the input image. Among the original images stored in the original image storage memory 113, the oldest one is deleted so as to store a newly input image, so that the original images of times T3 and T4 are stored in the original image storage memory 113.

In the next step, the in-GOP image encoding part 110 encodes the images of times T3 and T4, and the image C decoding part 111 decodes the encoded data. Then, the decoded images are stored in the decoded image storage memory 112. In this process, among the decoded images stored in the decoded image storage memory 112, the oldest one is deleted so as to store a newly decoded image. Therefore, the decoded images of times T2, T3, and T4 are stored in the decoded image storage memory 112.

In the next step, the image generation part 114 generates images by applying the image generation method X and the image generation method Y to the images stored in the image A storage memory 104 and the image B storage memory 108, and also applying the image generation method Z to the image of time T2 stored in the decoded image storage memory 112.

In accordance with the above processes, the GOP encoding determination part 117 uses the images generated by the image generation part 114 and the images stored in the decoded image storage memory 112, so as to compute the mean square errors Xa, Xb, Xc, Ya, Yb, Yc, D, and Z. In accordance with the logic determined by the above-described cases (1) to (8), the encoding data of the GOP is determined.

Based on the determined encoding data of the GOP, the video encoding apparatus in accordance with the present invention encodes and outputs the GOP encoding/non-encoding data, and also outputs the encoded data, or encodes and outputs the data for indicating the number of the generation reference-GOP and the data for indicating the image generation method. If the image generation method Z is selected, it is unnecessary to encode the data for indicating the image generation method.

When encoded data is output from the in-GOP image encoding part 110, the decoded image storage memory 112 continuously stores the decoded images obtained by the image C decoding part 111. On the other hand, when no encoded data is output from the in-GOP image encoding part 110, the decoded image storage memory 112 deletes the decoded images at times T3 and T4, and stores images corresponding to the encoding data of the GOP, determined by the GOP encoding determination part 117, among the images generated by the image generation part 114.

I-2. Video Decoding Apparatus of the Present Invention for Implementing the First Embodiment Below, the video decoding apparatus of the present invention for implementing the first embodiment will be explained.

Figure 3:
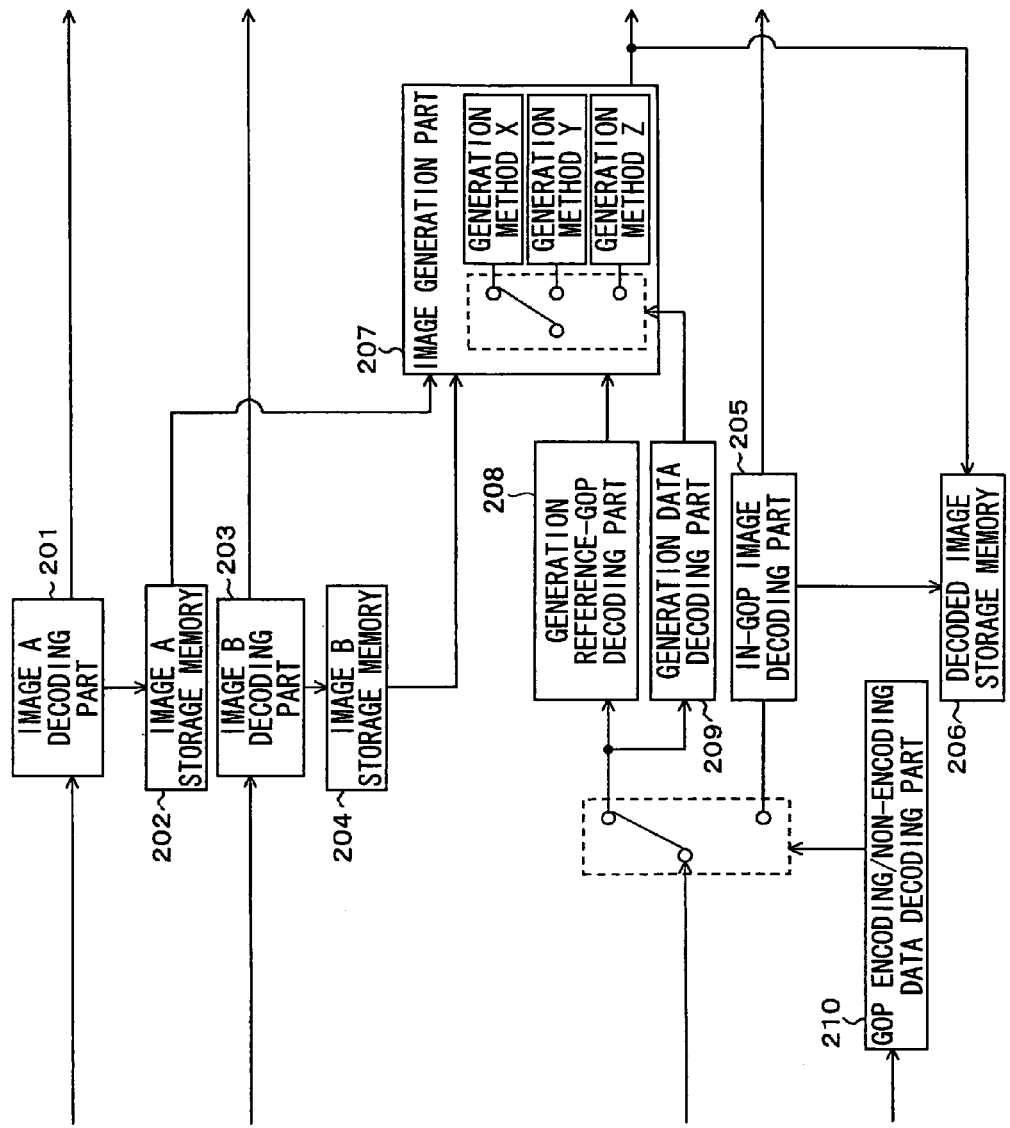
FIG. 3 is a diagram showing an example of the structure of the video decoding apparatus in the first embodiment.

FIG. 3 shows an example of the structure of the video decoding apparatus of the present invention for implementing the first embodiment.

As shown in FIG. 3, the video decoding apparatus in accordance with the present invention has:

(i) (with regard to the image A (camera-input video image A)) an image A decoding part 201 for decoding the image, and an image A storage memory 202 for storing the image decoded by the image A decoding part 201, (ii) (with regard to the image B (camera-input video image B)) an image B decoding part 203 for decoding the image, and an image B storage memory 204 for storing the image decoded by the image B decoding part 203, and (iii) (with regard to the image C (camera-input video image C)) an in-GOP decoding part 205 for decoding the image, an decoded image storage memory 206 for storing the image decoded by the in-GOP decoding part 205, an image generation part 207 for generating the image C, a generation reference-GOP decoding part 208 for decoding the data for designating the GOP used for generating the image C (actually, the data is the GOP number), a generation data decoding part 209 for decoding the data for designating the image generation method used for the generation of the image C, and a GOP encoding/non-encoding data decoding part 210 for decoding the data for designating whether the image of the GOP is decoded.

When the encoded data of the GOP is not decoded, the image generation part 207, the generation reference-GOP decoding part 208, and the generation data decoding part 209 operate as follows.

First, the generation reference-GOP decoding part 208 decodes and obtains the number of the GOP used for the image generation. When the obtained GOP number belongs to the image A or B, the generation data decoding part 209 decodes the data for designating the image generation method, so as to obtain X or Y as the data of the image generation method. When the obtained GOP number belongs to the image C, the generation data decoding part 209 does not decode the data for designating the image generation method.

The image generation part 207 then generates an image using the GOP number obtained by the generation reference-GOP decoding part 208 and the image generation method determined by the data for designating the image generation method, which is obtained by the generation data decoding part 209. When the GOP number belongs to the image C, the image generation part 207 uses the image generation method Z.

With the above structure, the video decoding apparatus in accordance with the present invention decodes the encoded data output from the video encoding apparatus in accordance with the present invention, as follows.

(i) Decoding Process at times T1 and T2

First, at times T1 and T2, the image A and the image B are decoded.

With regard to the image A, the image A decoding part 201 decodes the encoded data, and the image A storage memory 202 stores the decoded image. This process is applied to each image at times T1 and T2. Therefore, the images at times T1 and T2 are stored in the image A storage memory 202.

With regard to the image B, the image B decoding part 203 decodes the encoded data, and the image B storage memory 204 stores the decoded image. This process is applied to each image at times T1 and T2. Therefore, the images at times T1 and T2 are stored in the image B storage memory 204.

Next, with regard to the image C, the GOP encoding/non-encoding data decoding part 210 decodes the data for designating whether the encoded data of the GOP is decoded. Based on this data, one of the following processes is executed.

That is, when the GOP encoding/non-encoding data decoding part 210 decodes the data which indicates the decoding of the encoded data of the GOP, the in-GOP image decoding part 205 decodes the encoded data and outputs obtained images, and also stores the decoded images in the decoded image storage memory 206.

In contrast, when the GOP encoding/non-encoding data decoding part 210 decodes the data which does not indicate the decoding of the encoded data of the GOP, the generation reference-GOP decoding part 208 decodes and obtains the number of the GOP used for the image generation. Here, the obtained GOP number is assigned to the input image A or B (in this stage, the GOP number is never assigned to the image C because no previous frame exists); thus, the generation data decoding part 209 decodes the data for designating the image generation method, thereby obtaining X or Y as data of the image generation method. Accordingly, the image generation part 207 generates images using the GOP number obtained by the generation reference-GOP decoding part 208 and the image generation method determined by the data (for designating the image generation method) obtained by the generation data decoding part 209.

When the encoded data of the GOP is decoded, the decoded image storage memory 206 stores the decoded images, while when the encoded data of the GOP is not decoded, the decoded image storage memory 206 stores the images generated by the image generation part 207.

(ii) Decoding Process at Times T3 and T4

Next, a process similar to that performed at times T1 and T2 is performed at times T3 and T4, so as to decode the images A and B. Regarding the image A, each decoded image is stored in the image A storage memory 202, while regarding the image B, each decoded image is stored in the image B storage memory 204.

Next, with regard to the image C, the GOP encoding/non-encoding data decoding part 210 decodes the data for designating whether the encoded data of the GOP is decoded. Based on this data, one of the following processes is executed.

That is, when the GOP encoding/non-encoding data decoding part 210 decodes the data which indicates the decoding of the encoded data of the GOP, the in-GOP image decoding part 205 decodes the encoded data and outputs obtained images, and also stores the decoded images in the decoded image storage memory 206.

In contrast, when the GOP encoding/non-encoding data decoding part 210 decodes the data which does not indicate the decoding of the encoded data of the GOP, the generation reference-GOP decoding part 208 decodes and obtains the number of the GOP used for the image generation. When the obtained GOP number is assigned to the input image A or B, the generation data decoding part 209 decodes the data for designating the image generation method, thereby obtaining X or Y as data of the image generation method. When the obtained GOP number is assigned to the input image C, the generation data decoding part 209 can specify that the image generation method Z is used, and thus does not decode the data for designating the image generation method. Accordingly, the image generation part 207 generates images using the GOP number obtained by the generation reference-GOP decoding part 208 and the image generation method determined by the data (for designating the image generation method) obtained by the generation data decoding part 209. In this process, when the GOP number is assigned to the input image C, the image generation method Z is used.

When the encoded data of the GOP is decoded, the decoded image storage memory 206 deletes the images at times T1 and T2 and stores the decoded images. On the other hand, when the encoded data of the GOP is not decoded, the decoded image storage memory 206 deletes the images at times T1 and T2 and stores the images generated by the image generation part 207.

As discussed above, the video encoding apparatus in accordance with the present invention can encode the images at times T1, T2, T3, and T4, and the video decoding apparatus in accordance with the present invention can obtain the images at the corresponding times by decoding the encoded data or generating images corresponding to the times.

II. Second Embodiment

A second embodiment will be explained below.

In the first embodiment, the configuration of the GOP is predetermined (i.e., so as to have 2 frames): however, it is possible to adaptively select a configuration in which an independent GOP is assigned to a frame. The second embodiment is provided for implementing such a configuration.

Figure 4:
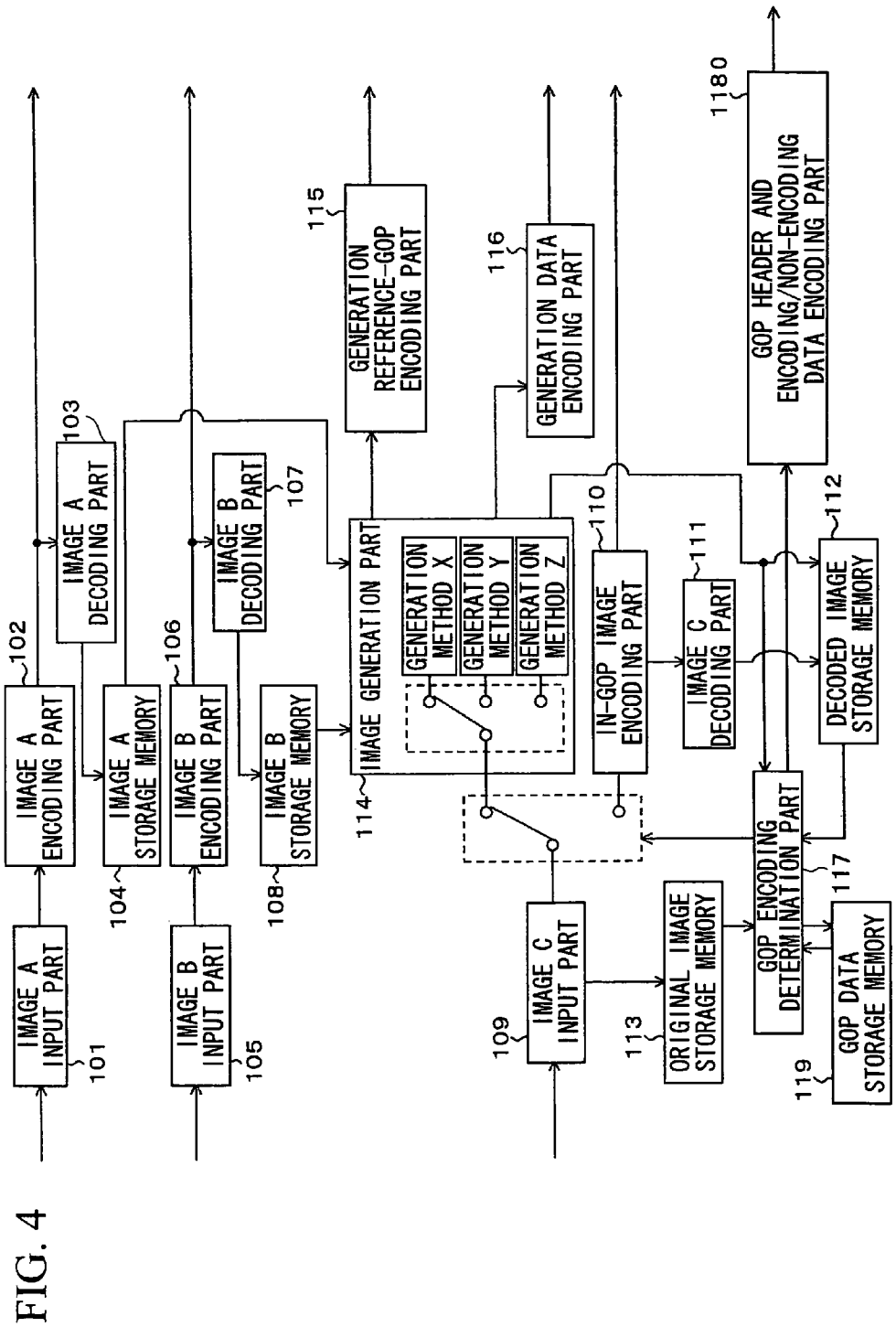
FIG. 4 is a diagram showing an example of the structure of the video encoding apparatus in the second embodiment.

FIG. 4 shows the structure of an example of the video encoding apparatus in accordance with the present invention, so as to implement the second embodiment. In FIG. 4, parts identical to those in FIG. 2 are given identical reference numerals.

In comparison with the first embodiment, this structure has a distinctive feature of providing a GOP data storage memory 119 and a GOP header and encoding/non-encoding data encoding part 1180 for encoding the encoding/non-encoding data and also the GOP header at the head of the GOP. The GOP header is a fixed-length code having a specific bit pattern.

Figure 6:
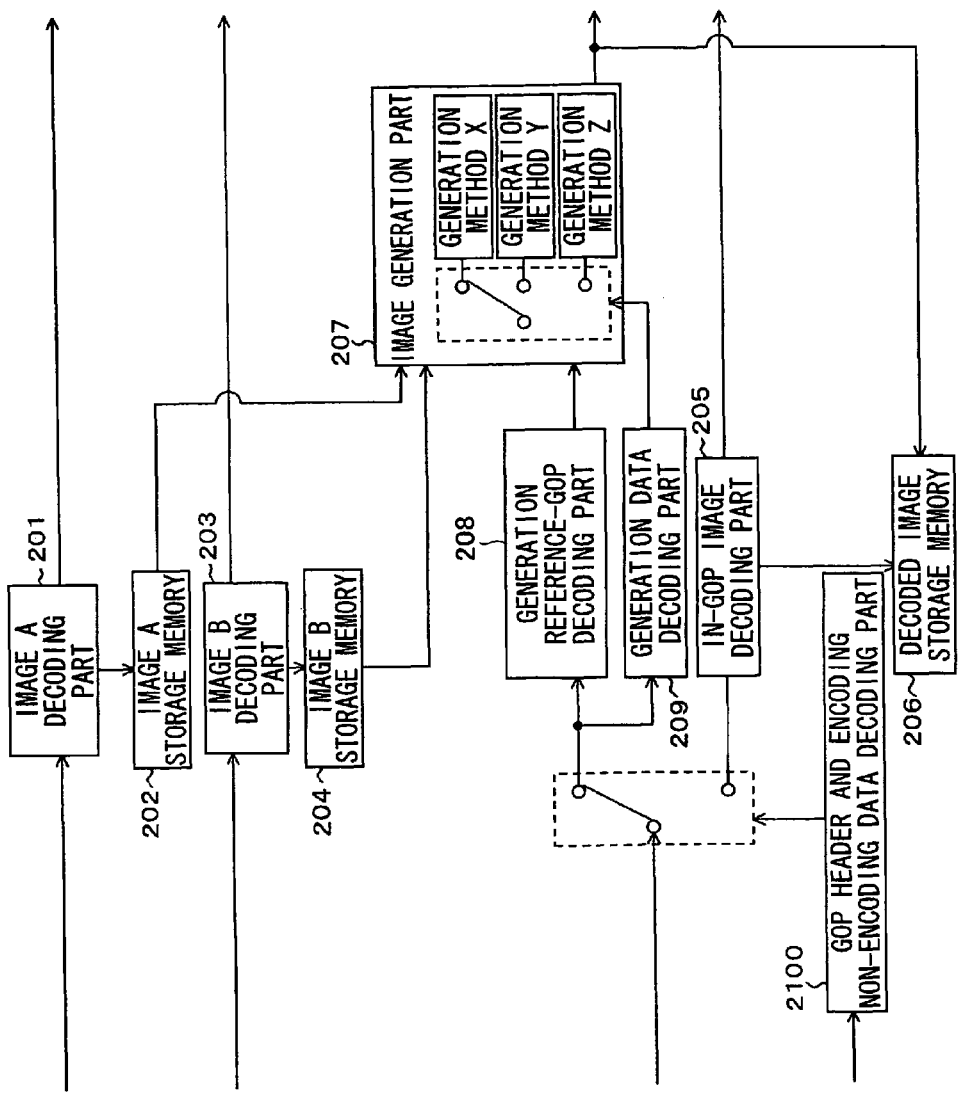
FIG. 6 is a diagram showing an example of the structure of the video decoding apparatus in the second embodiment.
Figure 7:
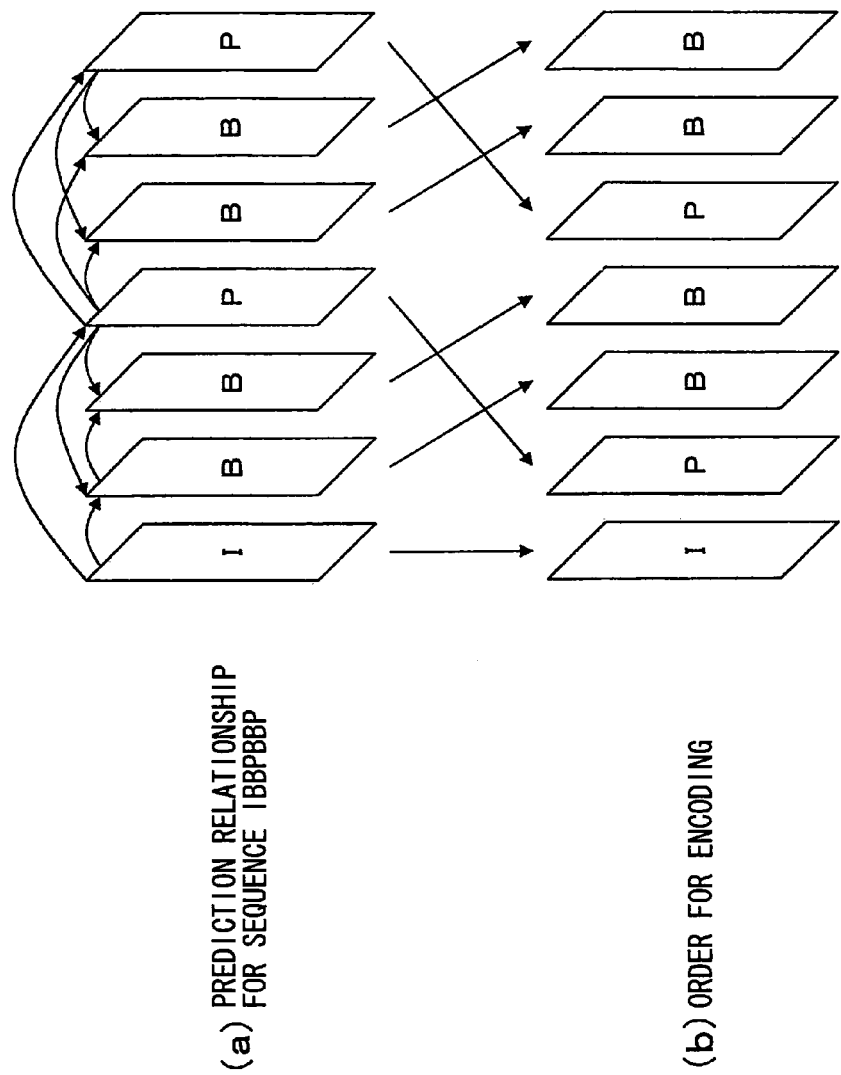
FIG. 7 is a diagram for explaining a prediction relationship of a video image.

On the other hand, the video decoding apparatus in accordance with the present invention for implementing the second embodiment may have a structure as shown in FIG. 6, which is similar to that shown in FIG. 3 which is employed in the first embodiment. However, a GOP header and encoding/non-encoding data decoding part 2100 checks the presence/absence of the GOP header for each frame. If the GOP header is detected, the GOP header and encoding/non-encoding data decoding part 2100 performs the decoding process of the relevant frame while handling the frame as one belonging to an independent GOP.

II-1. Encoding Process of the Second Embodiment

In the second embodiment, the camera input images A, B, and C are encoded as follows.

The images A and B at times T1 and T2 are encoded and then decoded similar to the first embodiment, thereby obtaining decoded images. Accordingly, the relevant decoded images for times T1 and T2 are stored in the image A storage memory 104 and the image B storage memory 108.

That is, with regard to the image A, the image is input using the image A input part 101, the image A encoding part 102 encodes this image, the image A decoding part 103 decodes the encoded data, and the image A storage memory 104 stores the decoded image. These steps are performed for each of the images at times T1 and T2. Therefore, the images at times T1 and T2 are stored in the image A storage memory 104.

With regard to the image B, the image is input using the image B input part 105, the image B encoding part 106 encodes this image, the image B decoding part 107 decodes the encoded data, and the image B storage memory 108 stores the decoded image. These steps are performed for each of the images at times T1 and T2. Therefore, the images at times T1 and T2 are stored in the image B storage memory 108.

(i) Encoding of image C at time T1

Next, the image C input part 109 inputs the image C at time T1, and the original image storage memory 113 stores the input image. The in-GOP image encoding part 110 encodes the image at time T1, and the image C decoding part 111 decodes the encoded data, and the decoded image is stored in the decoded image storage memory 112.

The image generation part 114 then generates images with respect to time T1 by applying the image generation method X and the image generation method Y to both the image stored in the image A storage memory 104 and the image stored in the image B storage memory 108. In this process, no previous frame is present; thus, it is impossible to generate an image using the image generation method Z.

Through the above processes, the GOP encoding determination part 117 uses the images generated by the image generation part 114 and the image stored in the decoded image storage memory 112, so as to compute the mean square errors Xa, Xb, Xc, Ya, Yb, Yc, and D (at this point, the mean square error Z cannot be obtained). In accordance with the above logic determined by the cases (1) to (8), the encoding data of the GOP is determined.

The GOP encoding determination part 117 stores the determined GOP encoding data in the GOP data storage memory 119, and the GOP header and encoding/non-encoding data encoding part 1180 encodes and outputs the GOP header. Based on the determined encoding data of the GOP, the video encoding apparatus in accordance with the present invention encodes and outputs the encoding/non-encoding data, and also outputs the encoded data, or encodes and outputs the data for indicating the number of the generation reference-GOP and the data for indicating the image generation method. If the image generation method Z is selected, it is unnecessary to encode the data for indicating the image generation method (in this stage, the image generation method Z cannot be selected).

When the encoded data is output from the in-GOP image encoding part 110, the decoded image storage memory 112 continuously stores the decoded image obtained by the image C decoding part 111. On the other hand, when no encoded data is output from the in-GOP image encoding part 110, the decoded image storage memory 112 deletes the decoded image at time T1, and stores an image which corresponds to the encoding data of the GOP (which is determined by the GOP encoding determination part 117) and is selected from among the images generated by the image generation part 114.

(ii) Encoding of Image C at Time T2

Next, the image C input part 109 inputs the image C at time T2, and the original image storage memory 113 stores the input image. The in-GOP image encoding part 110 encodes the image at time T2, the image C decoding part 111 decodes the encoded data, and the decoded image is stored in the decoded image storage memory 112.

The image generation part 114 then generates images with respect to time T2 by applying the image generation method X and the image generation method Y to both the image stored in the image A storage memory 104 and the image stored in the image B storage memory 108, and also applying the image generation method Z to the image of time T2 stored in the decoded image storage memory 112.

Through the above processes, the GOP encoding determination part 117 uses the images generated by the image generation part 114 and the image stored in the decoded image storage memory 112, so as to compute the mean square errors Xa, Xb, Xc, Ya, Yb, Yc, D, and Z. In accordance with the logic determined by the above-described cases (1) to (8), the encoding data of the GOP is determined.

The GOP encoding determination part 117 compares the determined encoding data of the GOP with the encoding data of the GOP, which is stored in the GOP data storage memory 119. When the compared data are different from each other, the GOP encoding determination part 117 determines that the image of the present frame is to be encoded as one belonging to another GOP. On the other hand, while when both data are the same, the GOP encoding determination part 117 determines that the image of the present frame is to be encoded as one belonging to the same GOP as that of the previous frame.

The GOP encoding determination part 117 stores the determined encoding data of the GOP in the GOP data storage memory 119. After this, the operation is performed as follows.

(ii-1) In the Case of the Encoding Frame Assigned to Another GOP

In the case of encoding the present frame as belonging to another GOP, the GOP header and encoding/non-encoding data encoding part 1180 encodes and outputs the GOP header. Based on the determined encoding data of the GOP, the video encoding apparatus in accordance with the present invention encodes and outputs the encoding/non-encoding data, and also outputs the encoded data, or encodes and outputs the data for indicating the number of the generation reference-GOP and the data for indicating the image generation method. In this process, when the image generation method Z has been selected, it is unnecessary to encode the data for indicating the image generation method.

When encoded data is output from the in-GOP image encoding part 110, the decoded image storage memory 112 continuously stores the decoded image obtained by the image C decoding part 111. On the other hand, when no encoded data is output from the in-GOP image encoding part 110, the decoded image storage memory 112 deletes the decoded image at time T2, and stores an image which corresponds to the encoding data of the GOP (which is determined by the GOP encoding determination part 117) and is selected from among the images generated by the image generation part 114.

(ii-2) In the Case of the Encoding Frame Assigned to the Same GOP

In the case of encoding the present frame as belonging to the same GOP, (i) when the encoded data is to be output from the in-GOP image encoding part 110, the encoded data of the present frame is output, while (ii) when the encoded data is not to be output from the in-GOP image encoding part 110, no data is output because the decoding side can specify the image generation method by referring to the encoding data of the GOP (which has been already communicated to the decoding side) assigned to the previous time T1.

When the encoded data is output from the in-GOP image encoding part 110, the decoded image storage memory 112 continuously stores the decoded image obtained by the image C decoding part 111. On the other hand, when no encoded data is output from the in-GOP image encoding part 110, the decoded image storage memory 112 deletes the decoded image at time T2, and stores an image which corresponds to the encoding data of the GOP (which is determined by the GOP encoding determination part 117) and is selected from among the images generated by the image generation part 114.

II-2. Decoding Process of the Second Embodiment

A corresponding decoding process in the second embodiment is performed as follows.

First, the images A and B at times T1 and T2 are decoded, similar to the first embodiment, thereby obtaining decoded images. Then, the decoded images of times T1 and T2 are stored in the image A storage memory 202 and the image B storage memory 204.

That is, with regard to the image A, the image A decoding part 201 decodes the encoded data, and the image A storage memory 202 stores the decoded image. This process is applied to the images at times T1 and T2, so that the images at times T1 and T2 are stored in the image A storage memory 202.

With regard to the image B, the image B decoding part 203 decodes the encoded data, and the image B storage memory 204 stores the decoded image. This process is applied to the images at times T1 and T2, so that the images at times T1 and T2 are stored in the image B storage memory 204.

(i) Decoding of Image C at Time T1

With regard to the image C at time T1, the GOP header and encoding/non-encoding data decoding part 2100 checks for the presence/absence of the GOP header. Here, the GOP header is detected; thus, the GOP header and encoding/non-encoding data decoding part 2100 decodes the data for designating whether the encoded data of the GOP is decoded (i.e., the encoding/non-encoding data). Based on this data, one of the following processes is executed.

That is, when the GOP header and encoding/non-encoding data decoding part 2100 decodes data which indicates the decoding of the encoded data of the GOP, the in-GOP image decoding part 205 decodes the encoded data and outputs an obtained image, and also stores the decoded image in the decoded image storage memory 206.

In contrast, when the GOP header and encoding/non-encoding data decoding part 2100 decodes data which does not indicate the decoding of the encoded data of the GOP, the generation reference-GOP decoding part 208 decodes and obtains the number of the GOP used for the image generation. Here, the obtained GOP number is assigned to the input image A or B (in this stage, the GOP number is never assigned to the image C because no previous frame exists); thus, the generation data decoding part 209 decodes the data for designating the image generation method, thereby obtaining X or Y as data of the image generation method. Accordingly, the image generation part 207 generates an image using the GOP number obtained by the generation reference-GOP decoding part 208 and the image generation method determined by the data (for designating the image generation method) obtained by the generation data decoding part 209.

Accordingly, when the encoded data of the GOP is decoded, the decoded image storage memory 206 stores the decoded image. On the other hand, when the encoded data of the GOP is not decoded, the decoded image storage memory 206 stores the image generated by the image generation part 207.

(ii) Decoding of Image C at Time T2
(ii-1) Decoding When GOP Header is Detected (i.e., when the encoding data of the GOP has been encoded)

With regard to the image C at time T2, the GOP header and encoding/non-encoding data decoding part 2100 checks for the presence/absence of the GOP header. When the GOP header is detected, the GOP header and encoding/non-encoding data decoding part 2100 decodes the data for designating whether the encoded data of the GOP is decoded. Based on this data, one of the following processes is executed.

That is, when the GOP header and encoding/non-encoding data decoding part 2100 decodes data which indicates the decoding of the encoded data of the GOP, the in-GOP image decoding part 205 decodes the encoded data and outputs an obtained image, and also stores the decoded image in the decoded image storage memory 206.

In contrast, when the GOP header and encoding/non-encoding data decoding part 2100 decodes data which does not indicate the decoding of the encoded data of the GOP, the generation reference-GOP decoding part 208 decodes and obtains the number of the GOP used for the image generation. When the obtained GOP number is assigned to the input image A or B, the generation data decoding part 209 decodes the data for designating the image generation method, thereby obtaining X or Y as data of the image generation method. When the obtained GOP number is assigned to the input image C, the generation data decoding part 209 can specify that the image generation method Z has been selected; thus, the generation data decoding part 209 does not decode the data for designating the image generation method. Accordingly, the image generation part 207 generates an image using the GOP number obtained by the generation reference-GOP decoding part 208 and the image generation method determined by the data (for designating the image generation method) obtained by the generation data decoding part 209. When the obtained GOP number is assigned to the input image C, the image generation method Z is used.

Accordingly, when the encoded data of the GOP is decoded, the decoded image storage memory 206 stores the decoded image. On the other hand, when the encoded data of the GOP is not decoded, the decoded image storage memory 206 stores the image generated by the image generation part 207.

(ii-2) Decoding When the GOP Header is Not Detected (i.e., when the GOP encoding data has not been encoded)

When the GOP header and encoding/non-encoding data decoding part 2100 detects no GOP header, the operation proceeds as follows.

When the encoded data was decoded for the previous frame, the in-GOP image decoding part 205 decodes the encoded data for the present frame, outputs a decoded image, and stores the decoded image in the decoded image storage memory 206.

When the encoded data was not decoded for the previous frame, the same encoding data of the GOP as that for the previous frame is assigned to the present frame; thus, the GOP number obtained by the generation reference-GOP decoding part 208 in the process for the previous frame is used in the present decoding. In this case, when the obtained GOP number is assigned to the input image A or B, the generation data decoding part 209 has already obtained X or Y as the data for designating the image generation method; thus, decoding is performed using this data. Here, the previous frame is the head frame; thus, the GOP number is never assigned to the input image C. However, in a general decoding process executed when the GOP header is not detected, if the GOP number is assigned to the input image C, then Z has already been obtained as the data for designating the image generation method because the generation data decoding part 209 did not decode the data for designating the image generation method (for the previous frame). Therefore, decoding is performed using this data Z.

Accordingly, the image generation part 207 generates an image using the GOP number obtained for the previous frame by the generation reference-GOP decoding part 208, and the image generation method determined by the data (for designating the image generation method) obtained from the previous frame by the generation data decoding part 209.

Therefore, when the encoded data of the GOP is decoded, the decoded image storage memory 206 stores the decoded image. On the other hand, when the encoded data of the GOP is not decoded, the decoded image storage memory 206 stores the image generated by the image generation part 207.

Figure 5:
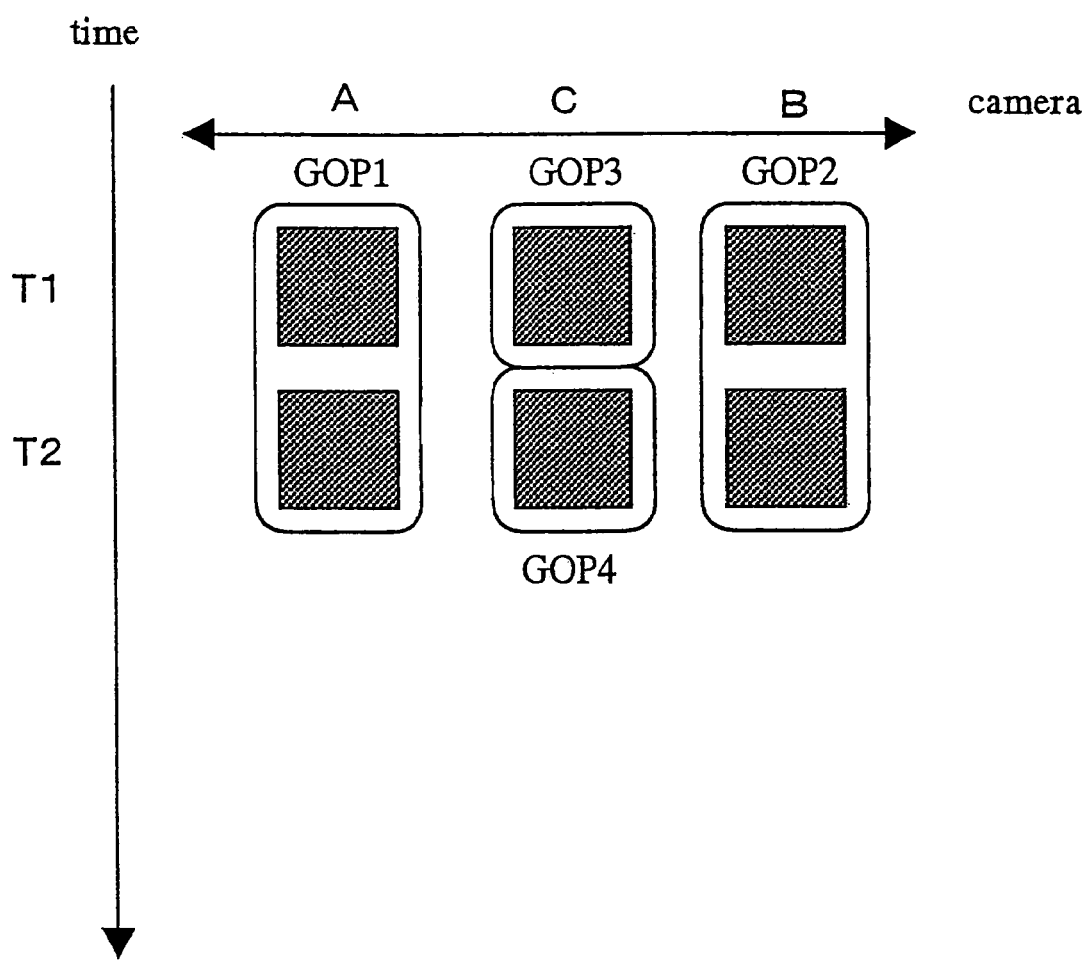
FIG. 5 is a diagram showing an example of the GOP configuration in the second embodiment.

In accordance with the above operation, even when the GOP configuration is not predetermined, the video encoding apparatus in accordance with the present invention can encode images, and the video decoding apparatus in accordance with the present invention can decode relevant encoded data. FIG. 5 shows the GOP configuration with respect to the encoded data obtained in the above operation.

The present invention has been explained using the embodiments together with the relevant drawings; however, the present invention is not limited to these embodiments.

For example, in the embodiments, decoded images of the images A and B are used for determining the image generation method for generating the image C; however, the original images of the images A and B may be used. In this case, the video encoding apparatus does not need to include the image A encoding part 102, the image A decoding part 103, the image B encoding part 106, and the image B decoding part 107.

Also in the embodiments, the image generation methods X and Y are provided; however, either one may be provided singularly. In this case, the video encoding apparatus does not need to include the generation data encoding part 116 and the video decoding apparatus does not need to include the generation data decoding part 209.

Additionally, in the embodiments, the image generation method Z is also provided; however, this may also be omitted. In this case, it is unnecessary to store the decoded image of the image C; thus, the video encoding apparatus does not need to include the image C decoding part 111 and the decoded image storage memory 112, and the video decoding apparatus does not need to include the decoded image storage memory 206.

Although no relevant explanation was provided in the embodiments, when the camera input image used for generating an image is predetermined, it is unnecessary to designate the GOP used for the image generation. Therefore, the video encoding apparatus does not need to include the generation reference-GOP encoding part 115, and the video decoding apparatus does not need to include the generation reference-GOP decoding part 208.

Also in the embodiments, in order to generate the image C, the image A or B obtained in synchronism with the image C is used; however, a past image A or B may be used, or a plurality of past images may be used.

Industrial Applicability

Whether the image can be generated on the decoding side can be determined in the encoding process, and the data for indicating that the image is to be generated can be encoded. Therefore, the image encoding side can control whether a video image is not to be encoded, thereby improving the encoding efficiency. Accordingly, it is possible to provide a video encoding and decoding technique preferably applicable to a video technique for changing the viewing position or direction.

The invention claimed is:

1. A video encoding method that assigns a plurality of images to a plurality of GOPs which correspond to different viewing positions or directions, and encodes images belonging to the GOPs as a video image, the method comprising:
    a GOP encoding determination step in which:
        if it is determined that each image belonging to a given GOP can be generated on a decoding side without using encoded data of a relevant image, it is determined that the relevant image is not encoded and no encoded data thereof is output; and
        if it is determined that each image belonging to the given GOP cannot be generated on a decoding side unless encoded data of the relevant image is used, then it is determined that the relevant image is encoded and the encoded data thereof is output;
    a GOP encoding/non-encoding data encoding step of encoding GOP encoding/non-encoding data for indicating whether the encoded data of the image belonging to the given GOP is output; and
    an in-GOP image encoding step of encoding the image belonging to the given GOP when the encoded data of the image is output
    wherein when a subject is included in said images belonging to the GOPs and it is determined that the relevant image of the given GOP is not encoded, image data of the subject having a viewing position or direction which corresponds to the given GOP is generated using data of the images belonging to the GOPs other than the given GOP.

2. A video encoding method in accordance with claim 1, wherein:
    the GOP encoding determination step includes determining whether an image generated by using one or more other GOPs without decoding the encoded data of the relevant GOP is closer to an original image of the relevant image in comparison with an image obtained by decoding the encoded data, so as to determine whether the image belonging to the relevant GOP is to be encoded.

3. A video encoding method in accordance with claim 1, further comprising:
    a generation reference-GOP encoding step of encoding generation reference-GOP designating data for designating one or more other GOPs which are used for generating the image belonging to the relevant GOP when the encoded data of this image is not output.

4. A video encoding method in accordance with claim 1, further comprising:
    a generation data encoding step of encoding generation data for designating an image generation method which is used for generating the image belonging to the relevant GOP when the encoded data of this image is not output.

5. A non-transitory computer-readable storage medium storing a video encoding program for making a computer execute a process used for implementing the video encoding method in accordance with claim 1.

6. A video decoding method that decodes encoded data generated by assigning a plurality of images to a plurality of GOPs which correspond to different viewing positions or directions, and encoding images belonging to the GOPs as a video image, the method comprising:
    a GOP encoding/non-encoding data decoding step of decoding GOP encoding/non-encoding data for indicating whether the encoded data of each image belonging to a given GOP is to be decoded; and an in-GOP image decoding step in which:
- if the GOP encoding/non-encoding data indicates that the encoded data of a relevant image is to be decoded, the relevant image is decoded by decoding the encoded data; and
- if the GOP encoding/non-encoding data indicates that the encoded data of the relevant image is not to be decoded, the relevant image is decoded by using an image generation method which does not use the encoded data of this image:

wherein when a subject is included in said images belonging to the GOPs and the GOP encoding/non-encoding data indicates that the encoded data of the relevant image is not to be decoded, image data of the subject having a viewing position or direction which corresponds to the given GOP is generated using data of the images belonging to the GOPs other than the given GOP.

7. A video decoding method in accordance with claim 6, further comprising:
a generation reference-GOP decoding step of decoding generation reference-GOP designating data for designating one or more other GOPs which are used for generating the image belonging to the relevant GOP when the encoded data of this image is not decoded.

8. A video decoding method in accordance with claim 6, further comprising:
a generation data decoding step of decoding generation data for designating the image generation method which is used for generating the image belonging to the relevant GOP when the encoded data of this image is not decoded.

9. A non-transitory computer-readable storage medium storing a video decoding program for making a computer execute a process used for implementing the video decoding method in accordance with claim 6.

10. A video encoding apparatus that assigns a plurality of images to a plurality of GOPs which correspond to different viewing positions or directions, and encodes images belonging to the GOPs as a video image, the apparatus comprising:
a GOP encoding determination part in which:
- if it is determined that each image belonging to a given GOP can be generated on a decoding side without using encoded data of a relevant image, the GOP encoding determination part determines that the relevant image is not encoded and no encoded data thereof is output; and
- if it is determined that each image belonging to the given GOP cannot be generated on a decoding side unless encoded data of the relevant image is used, then the GOP encoding determination part determines that the relevant image is encoded and the encoded data thereof is output;

a GOP encoding/non-encoding data encoding part for encoding GOP encoding/non-encoding data for indicating whether the encoded data of the image belonging to the given GOP is output; and
an in-GOP image encoding part for encoding the image belonging to the given GOP when the encoded data of the image is output:

wherein when a subject is included in said images belonging to the GOPs and the GOP encoding determination part determines that the relevant image of the given GOP is not encoded, image data of the subject having a viewing position or direction which corresponds to the given GOP is generated using data of the images belonging to the GOPs other than the given GOP.

11. A video encoding apparatus in accordance with claim 10, wherein:
the GOP encoding determination part determines whether an image generated by using one or more other GOPs without decoding the encoded data of the relevant GOP is closer to an original image of the relevant image in comparison with an image obtained by decoding the encoded data, so as to determine whether the image belonging to the relevant GOP is to be encoded.

12. A video encoding apparatus in accordance with claim 10, further comprising:
a generation reference-GOP encoding part for encoding generation reference-GOP designating data for designating one or more other GOPs which are used for generating the image belonging to the relevant GOP when the encoded data of this image is not output.

13. A video encoding apparatus in accordance with claim 10, further comprising:
a generation data encoding part for encoding generation data for designating an image generation method which is used for generating the image belonging to the relevant GOP when the encoded data of this image is not output.

14. A video decoding apparatus that decodes encoded data generated by assigning a plurality of images to a plurality of GOPs which correspond to different viewing positions or directions, and encoding images belonging to the GOPs as a video image, the apparatus comprising:
a GOP encoding/non-encoding data decoding part for decoding GOP encoding/non-encoding data for indicating whether the encoded data of each image belonging to a given GOP is to be decoded; and
an in-GOP image decoding part in which:
- if the GOP encoding/non-encoding data indicates that the encoded data of a relevant image is to be decoded, the in-GOP image decoding part decodes the relevant image by decoding the encoded data; and
- if the GOP encoding/non-encoding data indicates that the encoded data of the relevant image is not to be decoded, the in-GOP image decoding part decodes the relevant image by using an image generation method which does not use the encoded data of this image:

wherein when a subject is included in said images belonging to the GOPs and the GOP encoding/non-encoding data indicates that the encoded data of the relevant image is not to be decoded, image data of the subject having a viewing position or direction which corresponds to the given GOP is generated using data of the images belonging to the GOPs other than the given GOP.

15. A video decoding apparatus in accordance with claim 14, further comprising:
a generation reference-GOP decoding part for decoding generation reference-GOP designating data for designating one or more other GOPs which are used for generating the image belonging to the relevant GOP when the encoded data of this image is not decoded.

16. A video decoding apparatus in accordance with claim 14, further comprising:
a generation data decoding part for decoding generation data for designating the image generation method which is used for generating the image belonging to the relevant GOP when the encoded data of this image is not decoded.

* * * * *